United States Patent Office 2,995,165
Patented Aug. 8, 1961

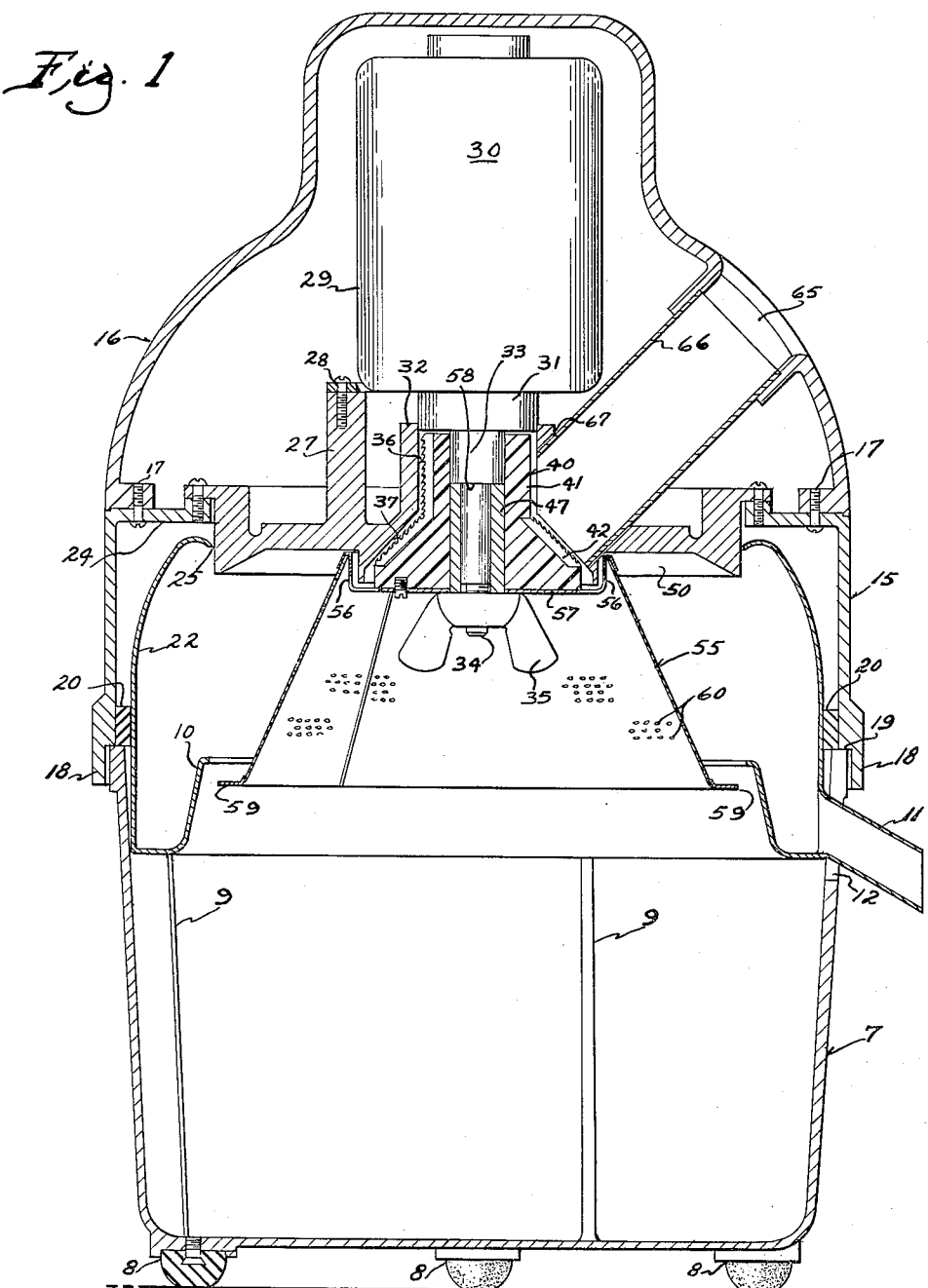

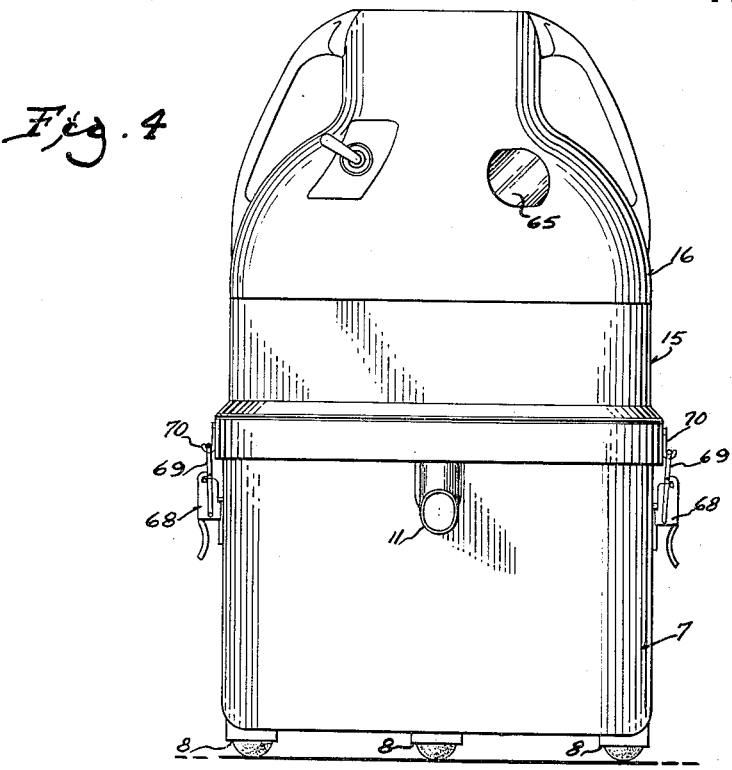
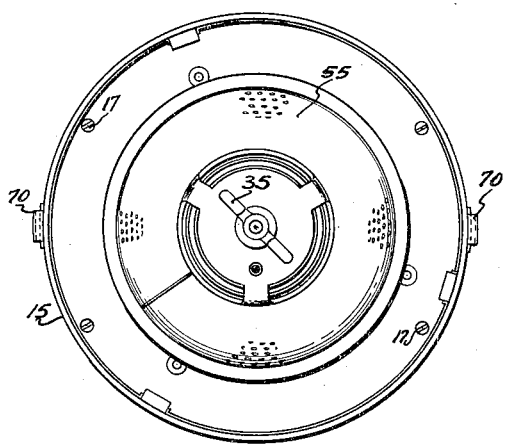
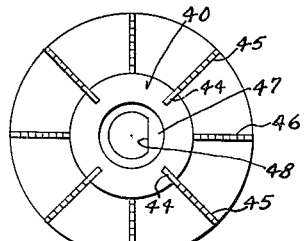
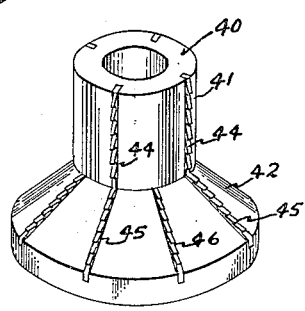

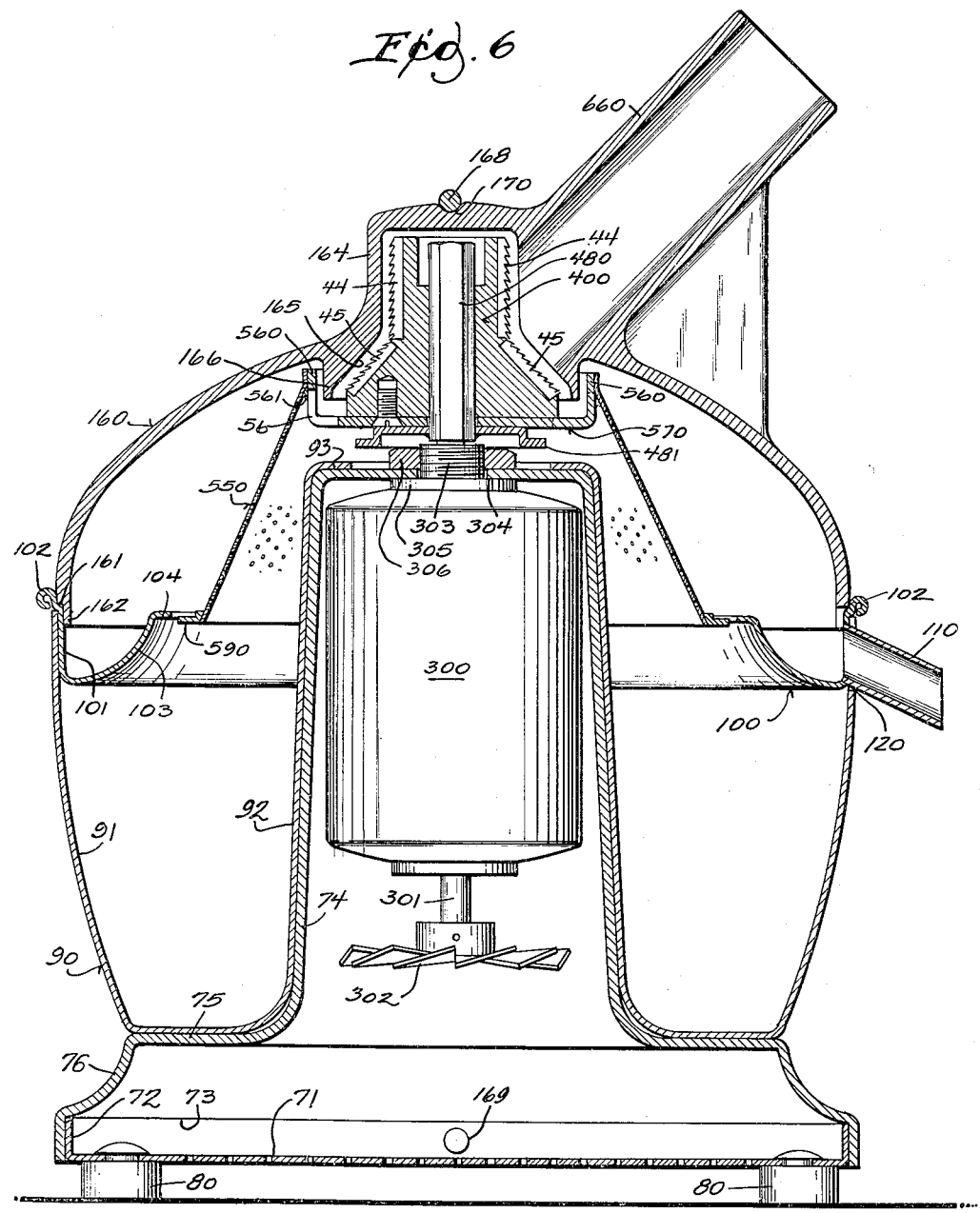

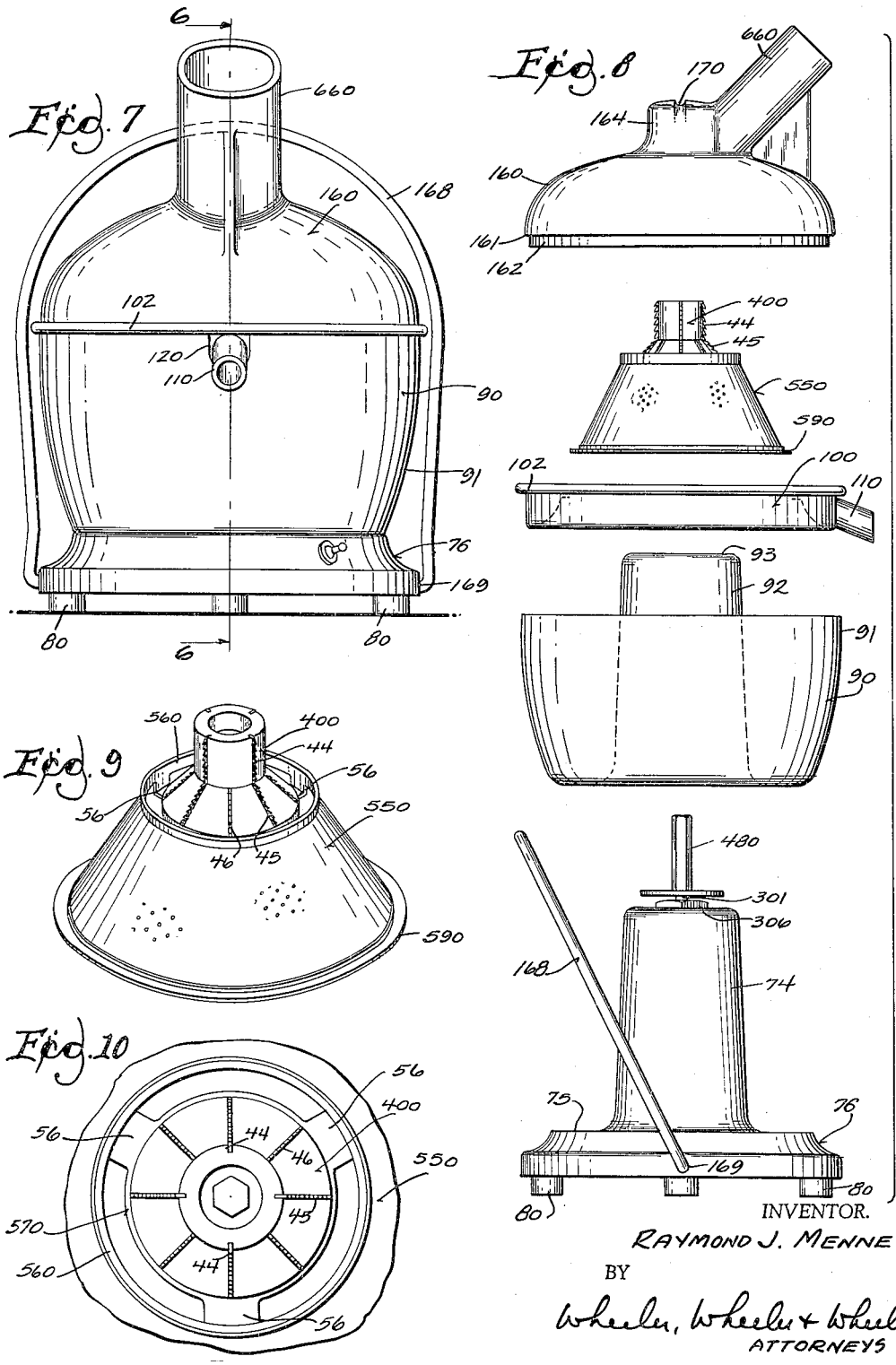

2,995,165
JUICER WITH POWER-DRIVEN GRATER AND CENTRIFUGE
Raymond J. Menne, East Troy, Wis., assignor to Hans Behnke, Milwaukee, Wis.
Filed Jan. 12, 1959, Ser. No. 786,084
18 Claims. (Cl. 146—76)

This invention relates to a juicer with power-driven grater and centrifuge. The present application is a continuation-in-part of my application 504,076, filed April 26, 1955, allowed July 16, 1958, and now abandoned.

In previously known devices of this type considerable difficulty has been encountered in handling the fiber of such stringy vegetables as celery. The instant device solves the problem very satisfactorily by an arrangement in which the grating device is desirably made of plastic to include cutting teeth projecting from surfaces which are angularly related in axial radial section. In the preferred embodiment a portion of the cutting head is cylindrical and another portion flares frusto-conically therefrom, the inlet hopper opening directly into the angle between these portions. It has been found that even the stringiest material is mascerated to release the juices for centrifugal extraction in the operation of this device.

In the preferred embodiment which is disclosed for the first time in the present application, there are significant advantages in compactness, simplicity, ease of manufacture and reduced number of parts and the ease with which the parts may be separated and reassembled to facilitate cleaning.

While a major feature of the invention has to do with the more adequate disintegration of the fiber, there are many other features which distinguish the present device including the relationship between the annular juice receiver and the multiple sections of its housing; the specific form and disposition of the juice collector; and the specific construction form and mounting of the centrifugal strainer which is rolled and welded of perforate sheet stock without die deformation, and is mounted on the upturned margins of a bracket through which the armature shaft extends and upon which the grating head is superimposed.

In the drawings:

FIG. 1 is a view in axial section through a device embodying the invention.

FIG. 2 is a perspective view of the cutting head on a slightly enlarged scale.

FIG. 3 is a plan view of the cutting head.

FIG. 4 is an external view in side elevation on a reduced scale.

FIG. 5 is an inverted plan view of the upper section of the housing and the associated centrifuge as these parts appear when removed from the base.

FIG. 6 is a view in axial section through the preferred embodiment of the invention on line 6—6 of FIG. 7.

FIG. 7 is a view on a reduced scale showing in side elevation the embodiment illustrated in FIG. 6.

FIG. 8 is a view showing in side elevation and in mutually separated positions the component parts which are readily separable for cleaning.

FIG. 9 is a view in perspective of the assembly of grating head and centrifugal strainer.

FIG. 10 is a fragmentary enlarged plan view of the assembly of FIG. 9.

The organization shown in FIGS. 1 to 5 will first be described.

The base portion 7 of the housing comprises a receptacle for the pulp and fiber from which juice has been extracted. It is a hollow vessel provided with supporting feet at 8 and it desirably has ribs 9 which not only reinforce it internally but stop vortex movement of the air and provide at their upper ends a support for the annular juice receiver 10 from which spout 11 extends through a notch 12 in the housing base 7 to discharge collected juice into any appropriate receptacle.

Removably fitted onto the housing base 7 is an intermediate housing element 15 with which the top housing element 16 is normally connected by means of screws 17 for unitary handling. A flange 18 about the lower margin of housing element 15 receives the upper end of housing base 7. Within it is a shoulder at 19 which rests upon the base. A plurality of cushions 20 of sponge rubber or the like are cemented to the housing element 15 to engage externally the upwardly convex wall portion 22 of the annular juice collector 10, thus maintaining the juice collecting vessel centered and substantially vibration free.

The housing element 15 is spanned by a generally horizontal partition web 24 with a depending shoulder telescoped into the opening 25 in the upper end of the annular juice receiver 10. The partition web 24 also has upwardly extending support 27 to which is screwed at 28 the shell 29 of the motor 30. A depending boss portion 31 of the shell is received telescopically into an upstanding sleeve 32 of the partition web 24 to constitute a closure therefor. Extending downwardly through boss 31 is the motor armature shaft 33 having its lower end portion 34 screw-threaded to receive the wing nut 35.

Sleeve 32 defines a cutter chamber which is generally cylindrical in its upper portion 36. However, below the portion 36 there is a frusto-conically flaring wall surface at 37. Keyed to rotate with armature shaft 33 is a cutter head 40 which has an upper generally cylindrical portion at 41, complementary to the cylindrical portion of sleeve 32. Lower down the head 40 has a flaring portion 42 complementary to the flaring wall 37. It is not essential that the portion 41 be exactly cylindrical, or that the angle between it and the flaring portion 42 be sharply defined, but it is very desirable that there be a definite variation of angle in a vertical radial plane between portions 41 and 42.

In each of these portions generally axial rows of teeth are mounted to project radially. The teeth may be parts of toothed blades 44 and 45 embedded in the synthetic resin composition of which the head 40 is molded. Hack saw blades have been found satisfactory. It will be observed that the blades 44 and 45 are disposed in a common radial plane. However in the flaring portion 42 additional blades 46 may be interposed between blades 45. The cutting head desirably has a bushing at 47 with a flat side at 48 complementary to a flat face on the armature shaft.

A depending annular skirt 50 desirably integral with the horizontal partition web 24 encloses the lower side wall of the cutting head nearly to the lower margin thereof to assure that material discharged centrifugally will have to pass below the top margin of the centrifugal strainer 55. The latter is supported by a bracket 56 comprising a central disk 57 which is apertured to receive the armature shaft 33 and bushing 47 and is engaged by the wing nut 35 which urges the cutting head against the shaft shoulder 58 to maintain the parts securely in assembly.

The centrifugal strainer 55 is desirably made of perforated plate rather than screening. Its form is generally frusto-conical. The arcuate blank is punched and then rolled and its ends joined, as by a weld. It has been found that the conventional die-formed screen has its perforations elongated and made sharp-edged. The present construction leaves the shape of the perforations unchanged and the edges smooth. Stringy fiber which catches on conventional screens does not catch on this screen.

The screen may terminate at its lower margin in a radial flange 59 which is primarily for reinforcement, since substantially all juice will have been discharged through the small openings 60 in the side walls before it reaches the lower margin of the centrifugal strainer.

Accordingly the juice separated from the material by the disintegration of its fiber or pulp by the cutting head will be thrown off centrifugally by the strainer and picked up by the vessel 10 and discharged through the spout 11. Centrifugal force will urge solids progressively downwardly and outwardly along the interior of strainer 55 until the solids are finally discharged into the receiver in base 7 being guided thereinto by the inner peripheral portion of the annular juice collecting vessel 10.

The top portion 16 of the housing is principally for ornamentation. However the portion 16 of the housing has the further function of providing a feeding opening at 65 from which a tube 66 extends substantially rigidly into an opening provided at 67 partly in the partition web 24 and partly in the sleeve 32 which projects upwardly from such web. Because the tube 66 opens directly into the interior of the sleeve 32 in immediate proximity to the path of rotation of the cutting head 40, it is necessary that the sleeve end be shaped in conformity with the adjacent surfaces of the cutter as will clearly appear in FIG. 1.

At all points, the terminal margin of the feeding hopper 66 is extremely close to the path of movement of the teeth of the blades 44, 45, 46. Apparently the disposition of the feeding tube or hopper where it is approximately centered upon the angle between imbedded blades 44, 45, of the cutting head, whatever the angle may be, has a great deal to do with the extremely effective disintegration of fiber which is achieved in the use of this machine.

It is also considered desirable that the material acted upon by the several blades 44, 45 and 46 tends to be immediately discharged centrifugally, since the angularly related surfaces in which the toothed blades are mounted are either axial or extend radially. It will be evident that but for the complementary surfaces of the sleeve 32 which hold the material in proximity to the blades during its centrifugal outward movement, the centrifugal discharge of the material from the teeth would occur instantaneously.

Lever type fastening devices 68 having loops 69 engaged over hooks 70 on the intermediate housing element 15 may conveniently be used to connect the unitarily handled housing elements 15 and 16 with the housing base 7. By removing these fastening devices, the entire upper portion of the housing may be removed from the base to give complete access to all of the parts which require cleaning. The housing elements 15 and 16 are not ordinarily separated at all. With these elements removed from the base, the juice collecting chamber 10 is fully exposed and free and can simply be lifted out and washed. With the elements 15, 16 inverted as shown in FIG. 5 the wing nut 35 is exposed and can be removed, whereupon the centrifuge strainer 55 can be lifted off and the cutting head 40 can be removed for cleaning and to expose the wall surfaces 36 and 37 and the inner end of the feed tube 66. The parts may be reassembled with equal facility. Meantime the base 7, unencumbered by any motor, will be fully exposed for the removal of fiber and the like and for washing.

The device shown in FIGS. 6 to 10, includes many of the features above described but is preferred by reason of its simplicity and the ease with which it may be manufactured and can be assembled and disassembled by the user.

The base 76 has a foraminous bottom wall 71 provided with feet 80 and provided with a margin flange 72 telescopically sleeved into the base and readily removable therefrom. The upper margin of the wall 72 seats against an interior shoulder 73 formed within the base. Centrally the base 76 provides a hollow column 74 closed at its upper end except for an aperture in which the motor is supported as hereinafter described. Externally of the central column 74, the base provides a shelf portion 75 upon which is mounted a pulp receptacle 90 having an outer wall 91, which also constitutes the lower portion of the outer wall of the entire assembly. This receptacle, is functionally a separable part of the base in the sense that it receives and supports the pump, and also supports the top element, as does the base 7 of FIG. 1. However, for the protection of the motor, and because of the difficulty of emptying and cleaning a compartment in which a heavy motor is mounted, the receptacle 90 is a separable part of the base. The pulp receptacle 90 also has an inner wall 92 which has a frusto-conical taper complementary to that of the column 74 and which seats firmly on the column when the receptacle 90 rests on the shelf portion 75 of the base. Desirably, the upper margin 93 of the pulp receptacle is swung inwardly to overlie and engage the peripheral outer portions of the outer end of the column 74. The outer side wall 91 of the pulp receptacle 90 has a lateral notch 120 through which projects the discharge spout 110 of the juice collecting trough 100.

The trough 100 has its outer wall 101 telescopically nested in the upper end of the outer wall 91 of the pulp receiver 90. The upper margin of the outer wall 101 of the juice trough 100 is flanged outwardly and/or beaded at 102 to rest on the upper margin of the outer wall 91 of the pulp receiver to positively define the assembled position of the juice trough 101 within the upper end of the pulp receiver.

The inner wall 103 of the juice trough 100 curves inwardly and upwardly from the lower end of the lower wall 101 and is flanged inwardly at 104 in a position in which it is closely fitted about and slightly at a higher level than the flange 590 on the lower margin of the centrifugal strainer 550. The relationship between the flanges 590 and 104 is intended to direct into the pulp receiver 90 all of the pulp moving downwardly on the inside of the centrifugal strainer 550, the juice passing through the strainer having been discharged centrifugally to be collected in the annular juice collecting trough 100, from which it is delivered through the spout 110.

The motor 300 desirably has a double ended armature shaft 301. On the projecting lower end of the armature shaft, a fan 302 is desirably used. While it supplies air over the motor to keep it cool, its principal purpose is to pre-load the motor to act as a governor and prevent the motor from racing and causing bearing damage when no work is being fed to the mascerating head. At the upper end of the motor, there is a threaded mounting sleeve 303 projecting above the radial clamping surface 304 of a collar 305 on the motor shell. The nut 306 threaded to the mounting sleeve 303 cooperates with the shoulder 304 to engage clampingly the upper end of the column 74 through which the threaded sleeve 303 projects. This securely mounts the motor within the column portion of base 76. The upper end of the armature shaft projects from mounting sleeve 303 and carries a sleeve 480 of non-circular external cross section, a hexagonal cross section being shown. The sleeve 480 is fixed in any desired manner to the armature shaft to be unitary therewith and to constitute, in effect, a part thereof. It constitutes an elongated coupling member for engaging an opening of complementary cross section in the grating head 400 to constrain the grating head to rotate with the armature shaft while permitting the grating head to be removed readily by simply lifting it upwardly from the shaft.

The grating head needs no specific description since it is identical with grating head 40 of FIG. 1 except for the special mounting provision just described.

Screwed to the under side of the grating head 400 is the bracket 570 which is likewise similar to that shown in FIGS. 1 to 5, having radial arms 56 which support an upper ring portion 560 to which the centrifugal strainer 550 is attached by solder 561 or otherwise. A disk 481 on the lower end of the hexagonal sleeve 480 supports the unitary assembly of grating head 400 and strainer 550, such assembly being separately illustrated in FIGS. 9 and 10. No nut or other securing device is required and consequently the assembly need only be lifted from the sleeve 480 when it is required to remove it for cleaning. Simply dropping it over the sleeve restores the parts to coupled association for use.

The disk 481, rotating with sleeve 480, is shouldered at 570 and serves as a slinger to preclude the material from entering the opening 921 in the upper end of the column 92 of the pulp container. It is very effective for this purpose notwithstanding that the flange 483 beyond the shoulder must be smaller than the opening 921 to permit ready removal of the pulp container for pulp discharge and for washing.

The cover member 160 is shouldered at 161 to rest on the peripherally offset margin of the juice collecting trough 100. An inner flange portion 162 of the cover 160 extends beyond the shoulder 161 to be received telescopically into the juice trough. Externally the cover member 160 fits within a bead 102 of the juicer.

Centrally the cover member 160 has an upward extension at 164 within which the grating head 400 is housed. The feeding tube or hopper 660 is integral, in this construction, and extends into close proximity with the grating head 400, the angle between the blades 44 and 45 desirably having the same relation to the feed tube or hopper as that described in connection with FIG. 1. The inner surface 165 with which the cover 160 is provided is desirably closely fitted to and complementary to the grating head 400, just as in the device of FIGS. 1 to 5. In this instance, however, the surface is part of the cover rather than any intermediate housing member. The flange 166 which depends from the housing intervenes between the path of the cutting head 400 and the non-perforate ring 560 at the upper end of bracket 570, thereby insuring that pulp discharged from the grating head will be required to engage the centrifugal strainer instead of passing over the top thereof.

To maintain the parts in assembly, a bail 168 such as may be made of heavy wire has its lower ends pivoted at 169 in the base 76 as best shown in FIGS. 6, 7 and 8. The intermediate portion of the bail has sufficient resilience so that it can be sprung over the top portion 164 of the cover member 160 into engagement with the groove 170 formed to receive it as best shown in FIGS. 6 and 8.

When the bail 168 is swung aside as shown in FIG. 8, the top 160 can be lifted off and the cutting head unit 400 withdrawn from the upper ends of the armature sleeve 480 taking centrifugal strainer 550 with it. The annular juice collecting trough 100 lifts off as shown in FIG. 8 and the annular pulp collecting receptacle 90 is then exposed and can be lifted from the base.

The parts may be restored with equal facility, simply setting the parts in place and fastening them with the bail 168, no other fastening means of any kind being required.

I claim:

1. In a juicer, a motor having an armature shaft and having means whereby the motor is supported with its armature shaft disposed vertically, a cutting head mounted on the armature shaft for rotation therewith and having surfaces which are angularly related to each other and provided with rows of projecting teeth at different levels, the rows of teeth on one of said surfaces being angularly related to the rows of teeth on the other of said surfaces by reason of the angular relation of said surfaces, both of said surfaces opening outwardly for radial centrifugal discharge of material acted on by said teeth, means encircling the cutting head and enclosing said surfaces in the path of centrifugal discharge of material acted on by said teeth, said means including a feed hopper leading to said cutting head at the angle between the rows of teeth projecting from the angularly related surfaces and having wall portions proximate the path of rotation of teeth which project from both surfaces, a centrifugal strainer connected with the shaft and having its top portion extending above the lower end of said shaft encircling means, whereby to receive juice and pulp and fiber from the cutting head, and an annular juice collector enclosing the centrifugal strainer.

2. The device of claim 1 in further combination with a housing element having elastic pads disposed in its inner periphery and engaged with the annular juice collector.

3. The device of claim 1 in which the strainer flares outwardly and downwardly, and in further combination with a bracket having an aperture to receive said shaft and supporting the centrifugal strainer, the cutting head being superimposed on said bracket on said shaft.

4. The device of claim 1 in which the centrifugal strainer comprises a screen provided with apertures which are free of distortion and have substantially square cut edges, whereby stringy fiber does not catch thereon.

5. The device of claim 1 in which said motor has a supporting base and the base comprises a central column, said motor being housed within said column and the juicer comprising a receptacle annular in form and encircling said column in detachable association with said base.

6. The device of claim 5 in which the said annular juice collector is telescopically engaged with the receptacle and has a portion seated thereon, and a top housing element being seated on the juice collector and having means biasing it releasably toward the base for maintaining the juice collector and receptacle detachably in assembly, the means providing the surfaces complementary to those of the cutting head as aforesaid being a part of said top element.

7. The device of claim 1 in which the centrifugal strainer flares outwardly and downwardly from its top portion and the motor has a supporting base provided with a pulp receptacle enclosing the lower end of the strainer to receive solids discharged therefrom.

8. The device of claim 7 in which said receptacle itself constitutes the base and is provided with supporting means upon which said annular juice collector is detachably mounted.

9. The device of claim 7 in which the base has a hollow column in which the motor is housed and which is encircled by said receptacle.

10. The device of claim 7, the juice collector having a mounting on the outer periphery of the receptacle and the said means encircling the cutting head including a top housing element supported from said base and upon which the means encircling the cutting head and the feed hopper are mounted.

11. A juicer comprising the combination with an annular base having a laterally opening notch in its upper margin, of an annular juice collector having inner and outer wall portions, the latter curving over the inner wall portion and having a margin axially spaced from the margin of the inner wall portion, a spout leading from said collector outwardly through said notch, said collector seating on the shoulder of the base, an intermediate housing element having a marginal flange embracing the base and spanning the notch and shouldered to seat upon said base, said housing element having means engaging the outer wall of the annular juice collector for the position thereof, a top housing element connected with the intermediate housing element for unitary handling, one of said elements being provided with a generally horizontal partition spanning the juice collector and having an annular boss portion received within the aforesaid margin of the outer wall portion of the juice collector, a motor in the top housing element having an armature shaft extending through said partition, a cutter head and a centrifugal strainer mounted on the armature shaft, said shaft having releasable means for detachably retaining the strainer and cutting head on the shaft, and a hopper leading through the top housing element to the cutting head and having wall portions terminally complementary to said head, the said head comprising a synthetic resin body portion having a generally cylindrical upper part and a generally frusto-conical lower part to both of which parts said hopper opens, said head further being provided with blades imbedded in its body portion and provided with teeth projecting outwardly therefrom, the said blades being in the cylindrical and frusto-conical parts whereby material in the hopper may be subjected concurrently to the action of the teeth projecting from both of said parts.

12. A juicer of the character described which comprises a cutting head mounted for rotation and having exposed teeth disposed in rows along surfaces of revolution, which surfaces are angularly related as viewed in axial cross section, one of said surfaces being substantially cylindrical and another of said surfaces being substantially frusto-conical, and means for feeding material into the angle between said surfaces to be engaged concurrently by teeth in rows which are angularly related.

13. The device of claim 12 in which the rows of teeth extend substantially axially of respective surfaces.

14. The device of claim 13 in which blades imbedded in the cutting head are provided with said teeth.

15. The device of claim 13 in which blades imbedded in the cutting head are provided with said teeth, the cutting head comprising a synthetic resin.

16. The combination with a hollow base provided centrally with an upstanding hollow frusto-conical column, of an annular pulp receptacle having an inner wall encircling the column and having an outer wall spaced outwardly from the inner wall and provided marginally with a notch, an annular juice collecting trough releasably telescoped within the outer wall and having a shoulder seated thereon and a spout disposed in the notch, said trough having an inner wall with a terminal pulp separating margin, a cover marginally seated on the outer wall of the juice collecting trough and holding said trough to the outer wall of the pulp collecting receptacle, said cover including a central annular depending flange interiorly having a frusto-conical surface above which said cover is provided with an opening, a grating head having a portion disposed within said frusto-conical surface and another portion within said opening, grating teeth projecting from the respective portions and disposed upon lines which are angularly related as viewed in side elevation, a motor having an armature shaft centered within said frusto-conical surface and upon which the grating head is detachably mounted, a feed hopper mounted on the cover and extending into immediate proximity to said grating head and opening at both sides of the angle between the teeth of said head, a bracket connected with said head and having radial and axially extending arms, and a centrifugal strainer flaring away from said head and carried by said bracket to receive material discharged from said head, said strainer terminating immediately beyond the pulp separating margin of the juice collecting trough whereby pulp on the interior of the strainer is deflected beyond said trough into the pulp receptacle while juice passing through the strainer is intercepted by said cover and flows into said trough.

17. The device of claim 16 in which the motor is mounted within the column of the base and the armature shaft projects upwardly therefrom into the opening of the cover, said shaft having a non-circular cross section, the said grating head being provided with a complementary opening and being freely removable from the armature shaft unitarily with said bracket and strainer, upon the removal of said cover.

18. The combination with a cutting head mounted for rotation and a feeding hopper leading to the cutting head and comprising guide walls terminating in close proximity to said head, the head having rows of cutting teeth extending in a direction generally axially of the head, certain of said rows being disposed at oblique angles to each other, the path of rotation of the apices of said angles extending across the delivery end of the hopper whereby material fed through the hopper to said head may be engaged concurrently by teeth in rows which are angularly related, a portion of said head being frusto-conical and another portion substantially cylindrical, the respective rows of teeth projecting from said respective portions.

References Cited in the file of this patent

UNITED STATES PATENTS

| | | |
|---|---|---|
| 1,030,186 | Joseph | June 18, 1912 |
| 2,527,695 | Bennett | Oct. 31, 1950 |
| 2,541,084 | Meier et al. | Feb. 13, 1951 |
| 2,757,696 | Billard | Aug. 7, 1956 |